United States Patent [19]

Tabourier

[11] 4,382,258
[45] May 3, 1983

[54] AIRBORNE FREQUENCY-MODULATION RADAR AND ITS APPLICATION TO A MISSILE HOMING HEAD

[75] Inventor: Remy Tabourier, Paris, France

[73] Assignee: Thomson-CSF, Paris, France

[21] Appl. No.: 199,994

[22] Filed: Oct. 23, 1980

[30] Foreign Application Priority Data

Oct. 26, 1979 [FR] France ............................... 79 26612

[51] Int. Cl.³ ............................................. G01S 13/26
[52] U.S. Cl. ............................................. 343/17.2 R
[58] Field of Search .................................. 343/17.2 R

[56] References Cited

U.S. PATENT DOCUMENTS

3,742,499 6/1973 Beydler ............................. 343/7.7
4,078,234 3/1978 Fishbein et al. ............... 343/17.2 R

OTHER PUBLICATIONS

"Frequency Modulation Techniques as Applied to Pulse Doppler Radar", IRE International Convention Records, George Hetrich, vol. 10 (1962.0326/29), 5, pp. 76-86.

"An Application of Correlation to Radar Systems", Tonkin and Savage, Radio and Electronic Engineer, vol. 42, No. 7, Jul. 1972.

*Primary Examiner*—T. H. Tubbesing
*Attorney, Agent, or Firm*—Oblon, Fisher, Spivak, McClelland & Maier

[57] ABSTRACT

In an airborne frequency-modulation radar designed for the homing head of a guided missile, enhanced resolution both in distance and in velocity is obtained by making use of a solid-state transmitter in conjunction with a frequency-modulating oscillator and by means of a receiver comprising a controlled frequency-shift oscillator.

11 Claims, 6 Drawing Figures

AIRBORNE FREQUENCY-MODULATION RADAR AND ITS APPLICATION TO A MISSILE HOMING HEAD

BACKGROUND OF THE INVENTION

1. Field of the Invention

This invention relates to a frequency-modulation airborne radar and is concerned with the application of a radar of this type to a missile homing head.

2. Description of the Prior Art

In certain types of equipment such as the homing or seeker heads of missiles, for example, it is necessary to provide a radar set which takes up limited space and offers high resolution both in distance and in velocity.

In order to meet this requirement, homing-head radars employed in the prior art and incorporated in equipment for directing missiles onto marine targets, for example, utilize high peak power and consequently provide satisfactory performances in the presence of isolated targets. In addition, the high and even superabundant power of such radar systems protect them against certain types of jammers. However, under the conditions which prevail at the present time, it must be possible in the first place to isolate a target within a complex environment, thus entailing the need for equipment which provides enhanced resolution in distance and velocity, with respect to marine targets and jammers having a power level such that the power emitted by the homing head no longer constitutes an effective shield. In the second place, these systems must not be readily sensed by warning detectors.

SUMMARY OF THE INVENTION

The aim of the invention is to satisfy these conditions of resolution by the definition of a frequency-modulation radar in which provision is made for a solid-state transmitter comprising semiconductor elements, for example. Frequency modulation permits utilization of transmitted and received signals which are coherent, thereby achieving enhanced separating power both in distance and in velocity. Furthermore, the solid-state transmitter offers a certain number of advantages which were not provided in the prior art, i.e.:

- reduction of noise interference applied to the digital circuits of the homing head and surrounding equipment;
- enhanced reliability produced by reduction of local temperature;
- high concealment capability with respect to wide-frequency-band warning detectors (the only type at present existing on small units);
- utilization of active components which have a priori superior reliability in comparison with oscillator tubes or amplifiers, especially in regard to long storage times;
- frequency agility which may be considerably greater, if so required, than the frequency agility of magnetrons employed in homing heads of the prior art;
- reduction of microphonism in comparison with vacuum-tube transmitters and especially in comparison with the agile-frequency magnetron, the parts employed in the construction of this magnetron being of the electromechanical type and therefore delicate.

In accordance with a distinctive feature of the invention, an airborne frequency-modulation radar comprises on the one hand transmission means, means for frequency-modulation and pulse-modulation of the transmitted wave and on the other hand receiving means, demodulating means, means for sampling, coding and filtering demodulated signals, frequency-translation means adapted to receive the echo signals reflected from the targets and signals having a frequency which is the sum of the frequencies of the signals produced by an oscillator and by the frequency modulation means. The signals delivered by the oscillator are at a frequency F given by the expression:

$$F = F_i + m\tau + f_m$$

where
- $F_i$ is a constant predetermined frequency,
- $m$ is the value of frequency-modulation slope of the modulating means,
- $\tau$ is a time-delay representing the selected search distance,
- $f_m$ is a term in the vicinity of the Doppler frequency and corresponding to the proper velocity of the missile with respect to a fixed ground-reference point.

BRIEF DESCRIPTION OF THE DRAWINGS

These and other features of the invention will be more apparent upon consideration of the following description and accompanying drawings, wherein.

DETAILED DESCRIPTION OF THE PREFERRED EMBODIMENTS

Figure 1:
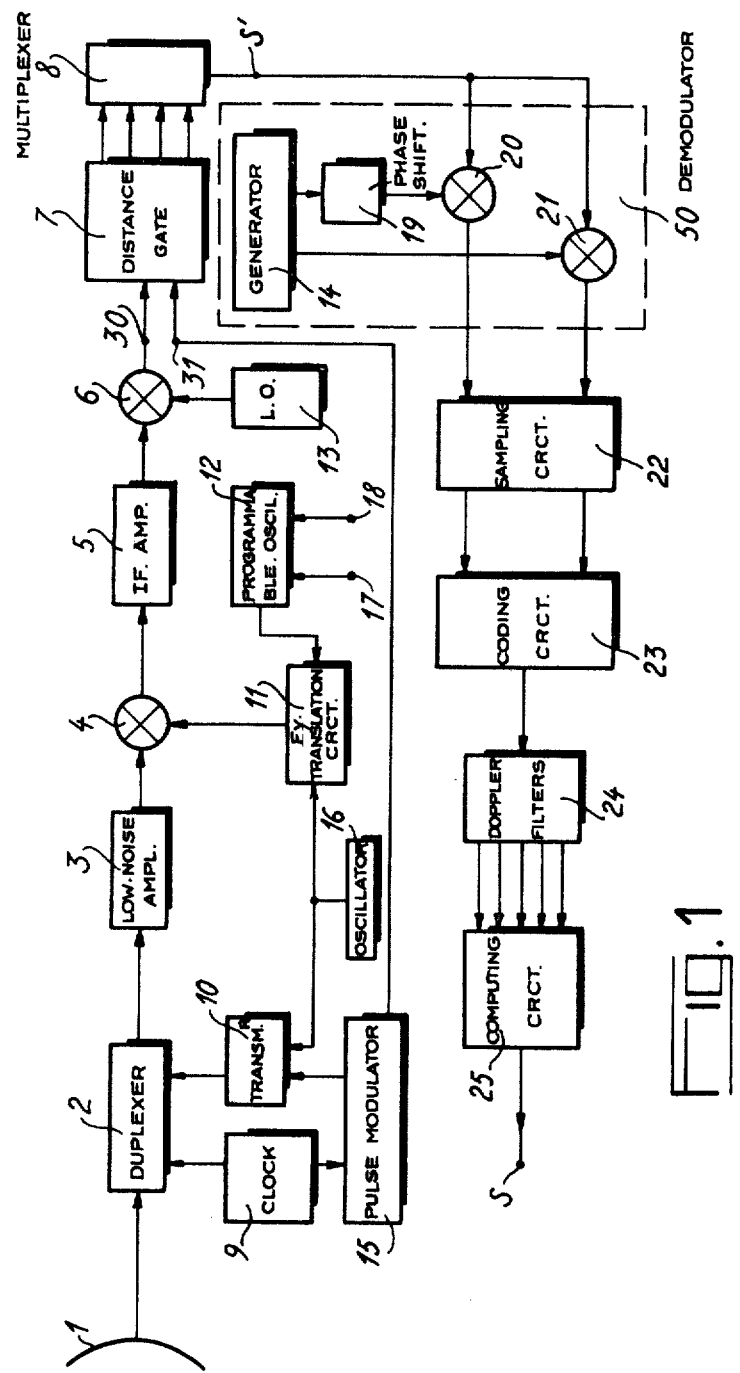
FIG. 1 is a general schematic diagram showing a first example of construction of the airborne frequency-modulation radar in accordance with the invention.

In FIG. 1, the radar comprises successively an antenna 1, a duplexer 2, a low-noise microwave amplifier 3, a first mixer 4, a first intermediate-frequency amplifier 5, a second mixer 6, a distance gate assembly 7, a multiplexer 8, a third and a fourth mixer 20 and 21 mounted in parallel, a sampling circuit 22, a coding circuit 23, an array of Doppler filters 24 and a computing circuit 25 not described here and permitting the utilization of received information for such purposes as followup control of the command system components of the missile on which said computing circuit is mounted. A clock circuit 9 is connected to the duplexer 2 and also to the pulse modulator 15, said modulator being connected to a transmitter circuit 10 which is in turn connected to the duplexer 2. An oscillator 16 which is controlled by a negative-slope or positive-slope sawtooth voltage is connected to the transmitter circuit 10 and to the mixer 4 via a frequency-translation circuit 11 which can consist, for example, of a single-sideband modulator. Said frequency-translation circuit 11 is also connected to a programmable oscillator 12 having inputs 17 and 18. A local oscillator 13 is connected to the mixer 6, and a generator 14 for producing signals adapted to the demodulation is connected directly to the mixer 21 and via a $\pi/2$ phase-shifting circuit 19 to the mixer 20. The assembly formed by the mixers 20, 21 of the phase-shifter 19 and by the generator 14 constitutes the demodulating circuit 50.

Consideration will now be given to the operation of the system described in the foregoing. It will be assumed by way of example that the periodic frequency-modulation having an amplitude N$\Delta$F where N is any predetermined whole number is carried out in accordance with a negative-slope sawtooth law having a period N $T_R$.

The transmitter circuit 10 delivers a signal to the antenna 1 via the duplexer 2, the frequency fe(t) of which varies with time in accordance with a law which repeats itself periodically at time intervals N $T_R = f_e(t) = f_o - mt$ where:

$$m = |\Delta F/T_R|$$

and fo corresponds to the nominal frequency of the circuit 10.

The frequency term -mt is given by the oscillator 16 which delivers a sawtooth frequency-modulated voltage at the period N $T_R$. This voltage controls the frequency of the transmitter circuit 10 by means of a phase loop, for example. The modulator circuit 15 delivers pulses at the period T which modulates the signal of the transmitter circuit 10. A clock circuit 9 controls the modulator 15 and the duplexer 2 in synchronism. If a target is located at the distance d from the radar and is moving at a relative radial velocity $V_R$, the echo signal returns to the antenna 1 at a frequency $f_R$ given by the equation:

$$f_R = f_e(t-\tau) + F_d$$

with $\tau = (2d)/(vc)$ and $Fd = (2VR)/(vc)fo$ where $v_c$ is the velocity of propagation of light in the medium considered, and $F_d$ is the Doppler frequency produced by the motion of the target.

$$f_R = f_O - m(t-\tau) + F_d = f_e + m\tau + F_d$$

Thus the beat of the received signal with the signal derived from the transmitter circuit 10, which is displaced by a fixed value so as to permit amplification at an intermediate frequency, has a constant frequency. Frequency translation is carried out by the mixer 4 which receives on the one hand the received signal amplified by the amplifier 3 and on the other hand a signal delivered by an oscillator 12 and previously mixed in the frequency-translation circuit 11 with a signal which is identical with that of the transmitter 10. The signal delivered by the oscillator 12 has a frequency $f_1$ such that:

$$f_1 = F_i + m\tau + fm$$

where

Fi is the intermediate frequency corresponding to the amplifier 5, and fm applied to the first input 17 of the programmable oscillator 12 is a term equal to Vm cos $\theta + V_k 2f_0/v_c$ where Vm is the missile velocity, $v_c$ is the velocity of the light in the medium considered $\theta$ is the angle formed by the missile velocity and the direction of the target, $f_0$ is the nominal frequency of the transmitter $V_k$ is the radial velocity of the target, and $m\tau$ is a term applied to the second input 18 of the programmable oscillator 12, wherein m is the slope of the frequency modulation and $\tau = 2d/v_c$ the time-delay representing the selected search distance d.

At the output of the intermediate-frequency amplifier 5, a second frequency change is performed by means of the mixer 6 which is connected to the local oscillator 13.

Figure 2:
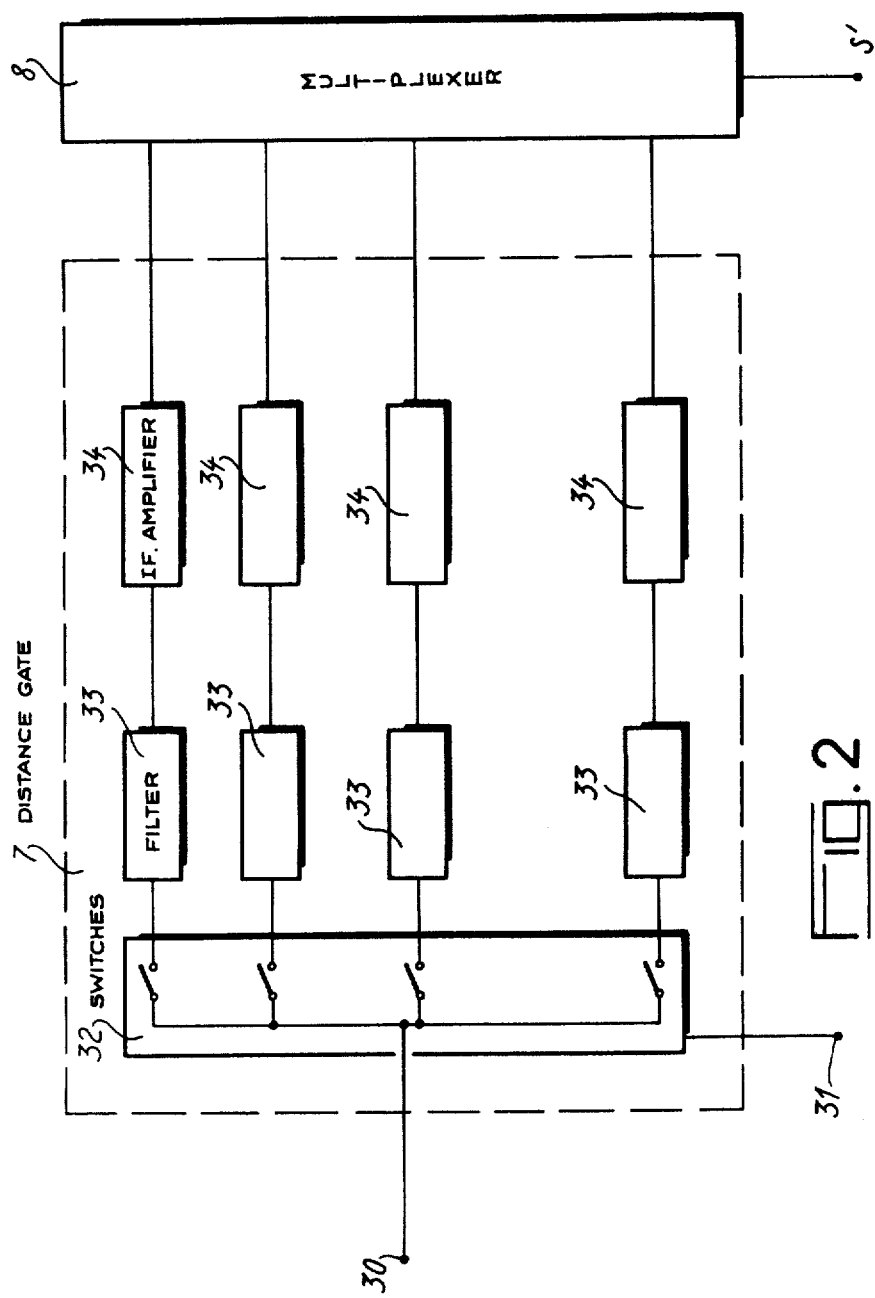
FIG. 2 is a schematic diagram showing an example of construction of the distance selection circuit.

At this stage of processing of the signal, two targets coincide if $m\tau_1 + F_{d1} = m\tau_2 + F_{d2}$ and if $\tau_1 - \tau_2 = kT_R$ (k being a whole number) and $\tau_{1,2} = (2d_{1,2})/(vc)$ A distance gate circuit 7 is placed at the output of the mixer 6: the operation of this circuit is illustrated in FIG. 2. Said circuit comprises a bank 32 of P switches operated at regular intervals by cyclic permutation by means of the signal of the modulator 15, with the result that each operating cycle has a period equal to $T_R$, P being defined by $P = (TR/\gamma) - 1$, where $\gamma$ represents the width of the modulation pulses.

Each controlled switch is connected to a multiplexer 8 by means of a bandpass filter 33 mounted in series with an intermediate-frequency amplifier 34 which can be designed to provide a frequency change (not shown in the figure). By way of a particular numerical example, the passband of the filter 33 is approximately 7 kHz and, in a general sense, has a sufficient frequency range to permit the passage of at least the Doppler frequency of the target $F_d$ to which is added the uncertainty arising from the azimuth of the target. The items of information delivered by the different intermediate-frequency amplifiers 34 are transmitted successively by the multiplexer 8 to two mixers 20 and 21. By means of the oscillator 14 and the $\pi/2$ phase-shifter 19, said mixers 20 and 21 make it possible to translate each of the useful signals having a frequency in the vicinity of zero along two components in quadrature. The sampling circuit 22 and coding circuit 23 digitize these items of information so as to permit easy processing by the Doppler filters 24. Finally, a computer 25 (which will not be described) extracts from these items of information the values of d and $V_R$ which serve to characterize the targets and if necessary to permit subsequent tracking of one of the targets.

Figure 3:
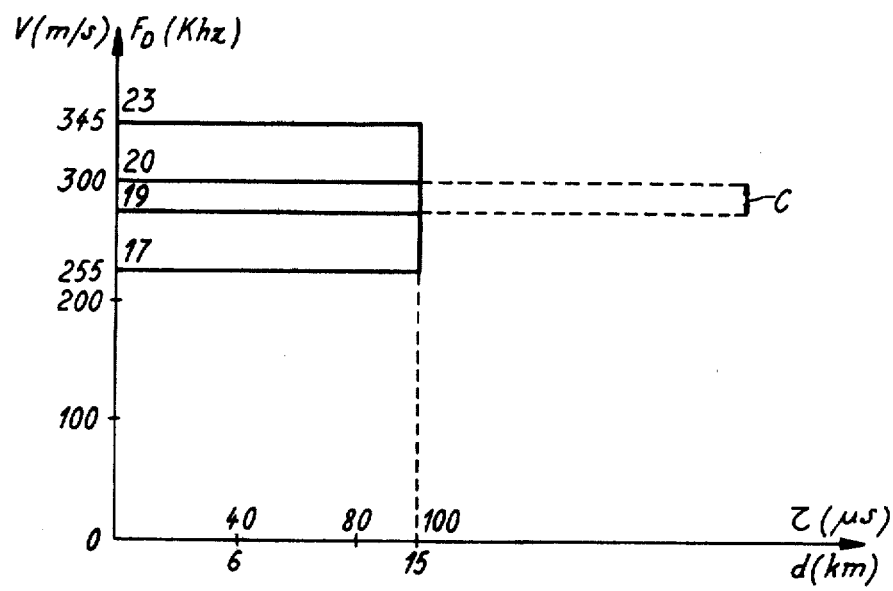
FIG. 3 is a diagram showing an example of the fields of distribution of ground echos and of targets.

FIG. 3 shows respectively the Doppler-frequency field of the targets and the ground-echo field denoted by C in a particular example which is not given in any limiting sense and corresponds to utilization of the frequency-modulation radar in accordance with the invention in a missile homing head. The frequency band C from 19 to 20 kHz accordingly corresponds to the spurious ground echos located in the main lobe of the antenna. In actual fact, although the Doppler frequency range above 20 kHz is free from noise produced by ground echos, the Doppler frequency range below 19 kHz exhibits a residual ground echo noise level arising from the minor antenna lobes of the homing head.

Figure 4:
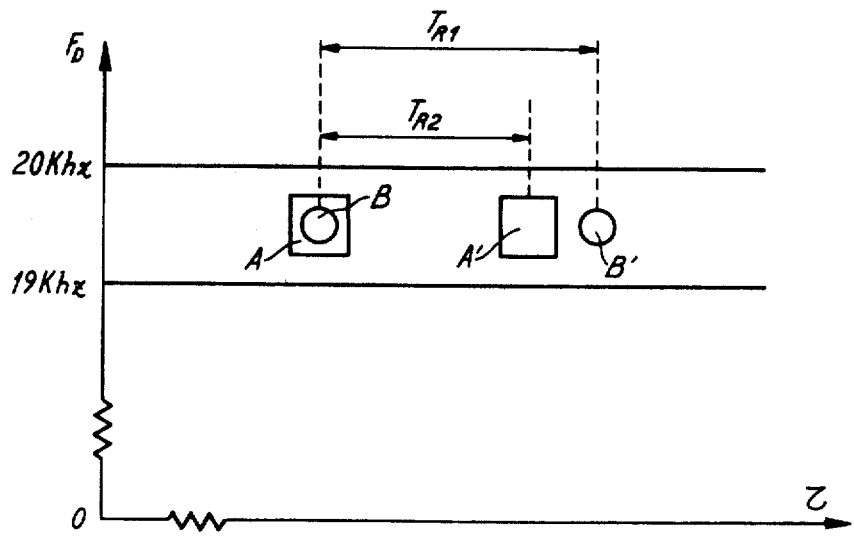
FIG. 4 is a diagram showing the distance ambiguity arising from the choice of repetition frequency without frequency modulation.

By reason of its low transmitting power, the choice of a solid-state transmitter results in a transmitted-pulse form factor which is higher than a non-adjustable minimum. Furthermore, the need to track the target at the shortest possible distance with a single antenna prohibits the use of pulses having excessive widths. This value range entails the need to select a value of the pulse repetition period $T_R$ which is higher than a predetermined minimum value. As a consequence, however, two targets A and B are liable to coincide within a single range box. This ambiguity is removed, however, by making use of at least two separate measuring cycles corresponding to two distinct values $T_{R1}$ and $T_{R2}$ of the pulse repetition period. This removal of ambiguity is shown in FIG. 4 in the case of two distinct repetition periods in the absence of frequency modulation.

Figure 5:
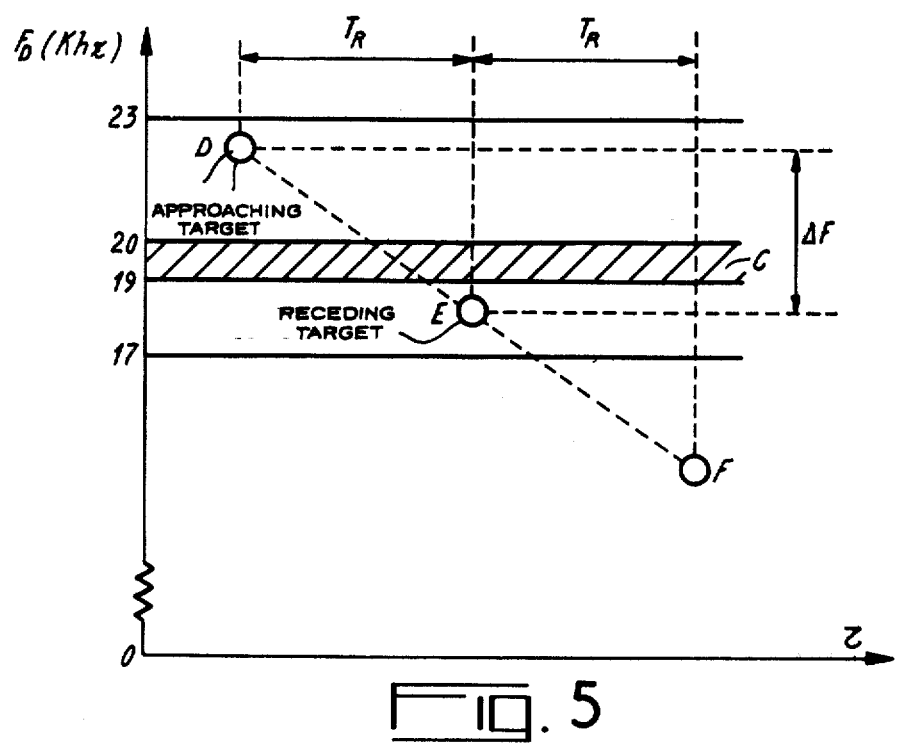
FIG. 5 is a diagram illustrating the choice of the frequency-modulation slope.

If the Doppler frequency $F_d$ of the target is slightly lower than 20 kHz as is the case in the example shown in FIG. 3, said frequency is liable to interfere with the responses of the ground elements or stationary echos corresponding to the zone of maximum noise. This disadvantage is overcome in accordance with the present invention by making a suitable choice of the frequency-modulation slope. As a function of the numerical example considered, an acceptable value is such that $\Delta F \geq 4$ kHz. This situation is illustrated in FIG. 5. In fact, a value of this order is such that an approaching target D cannot interfere with the principal noise C produced by ground echos and makes it possible for a receding target E to produce an echo whose Doppler frequency is also outside the zone C of maximum noise. As experiments have demonstrated, all the values of $\Delta F$ which can serve to avoid the central noise zone C when it is possible to do so can in fact be allowed and permit correct operation of the radar in accordance with the invention. In a preferential embodiment of the invention, the value adopted for $\Delta F$ will be sufficiently low to ensure that the first distance ambiguity given by the expression $(1/|\Delta F|) = (v_c/2)$, where $v_c$ is the velocity of light within the medium considered, remains greater than the maximum distance of the objectionable stationary echos.

The width $\gamma$ of transmitted pulses is chosen so as to be approximately equal to $1/N.\Delta F$, where N represents the number of pulses emitted during a period $NT_R$.

Figure 6:
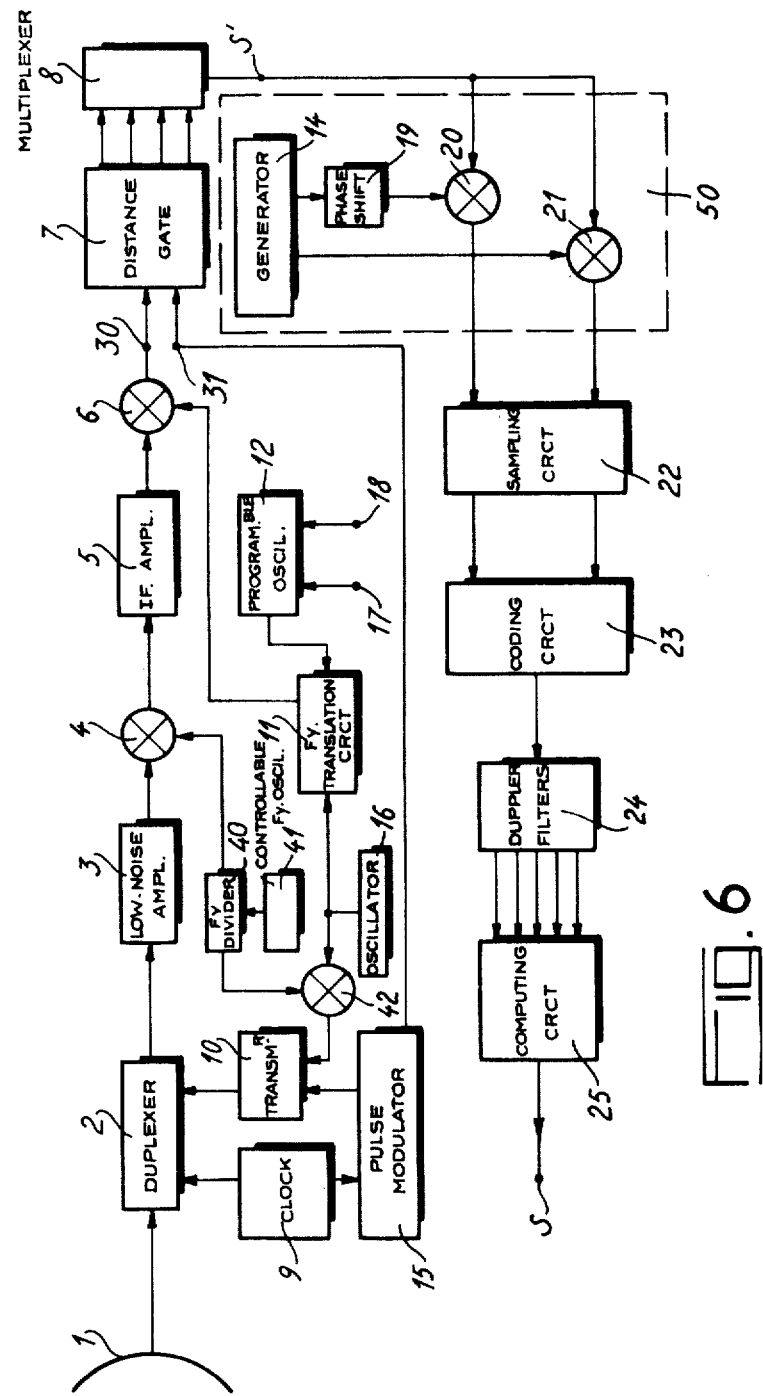
FIG. 6 shows a second example of construction of the radar in accordance with the invention.

An alternative embodiment of this device is shown in FIG. 6. In this second embodiment, the local oscillator 13 is dispensed with. The output of the frequency-translation circuit 11 is connected in this case, not to the first mixer 4, but to the second mixer 6. Provision is also made for a fifth mixer 42 connected between the frequency-modulated oscillator 16 and the transmitter circuit 10. Finally, a controllable-frequency oscillator 41 is connected to the mixers 4 and 42 via a frequency-divider circuit 40 or directly. The other elements as well as their functions remain unchanged.

The modifications introduced in the device are intended to modify the emitted frequency and therefore the received frequency to the same extent, thus permitting freedom in the emitted frequency which may prove highly useful in the presence of a jammer whilst the intermediate frequencies remain constant.

We have thus described a frequency-modulation radar system in accordance with the invention as well as the application of this system to the homing head of a guided missile.

What is claimed is:

1. An airborne frequency-modulation radar comprising a transmission-reception antenna and a duplexer connected on the one hand with transmission means for delivering a wave which is frequency-modulated by first modulating means and pulse-modulated by second modulating means and on the other hand with reception means including demodulating means, means for sampling, coding and filtering demodulated signals, wherein the form factor of the modulation pulses generated by the second modulating means being much lower than $\frac{1}{2}$, the reception means further comprises:

means for adding the frequency of the output frequency-modulated signal of the first modulating means and the frequency $F = f_i + m\tau + fm$ of the signal delivered by a voltage-controlled oscillator, wherein m is the slope of the frequency-modulation carried out by the first modulating means, fi a constant predetermined intermediate frequency, $\tau$ a time-delay $(2d/Vc)$ representing the selected search distance d, Vc being the velocity of the light in the medium considered, $f_m$ is equal to $2 f_0(V_m \cos \theta + V_k)/Vc$, $V_m$ being the velocity of the missile, $V_k$ the radial velocity of the target, $f_0$ the nominal frequency transmitted and $\theta$ the angle between the velocity $V_m$ of the missile and the direction of the target; and means for mixing the echo signal reflected from the target and the signal delivered by the adding means.

2. An airborne frequency-modulation radar according to claim 1, wherein the reception means further comprise an array of p distance gates connected to the output of the mixing means through an amplifier at the first intermediate frequency fi and second mixing means fed with a local oscillator for translating at a second intermediate frequency and comprising a bank of p switches controlled by the second modulating means, each of the p controlled switches being connected in series with a bandpass filter and an intermediate-frequency amplifier.

3. An airborne frequency-modulation radar according to claim 2, wherein the second modulating means comprises means for generating an output pulse having a repetition period $T_R$ and a length $\gamma$ whereby the time interval between the successive operations of two of said bank of p switches is equal to $T_R/\gamma$.

4. An airborne frequency-modulation radar according to claim 2, wherein the passband of the filters is higher than the sum of the frequency bands corresponding to the Doppler frequencies to be measured and of the error in said Doppler velocity due to pointing of the antenna in a direction other than that of the axis of displacement of the radar.

5. An airborne frequency-modulation radar according to any one of claims 1 to 4, wherein the first modulating means is a master oscillator controlled by a sawtooth voltage having a negative slope m.

6. An airborne frequency-modulation radar comprising a transmission-reception antenna and a duplexer connected on the one hand to transmission means delivering a wave which is frequency modulated by first modulating means and pulse-modulated by second modulating means and on the other hand to reception means including demodulating means, means for sampling, coding and filtering demodulated signals, wherein the second modulating means generating pulses with a form factor much lower than $\frac{1}{2}$, the first modulating means comprises:

a master oscillator delivering a signal linearly frequency-modulated by a sawtooth voltage;

a controllable frequency oscillator supplying a frequency divider; and means for mixing the output signals of the master oscillator and of the frequency divider and supplying the transmission means.

7. An airborne frequency-modulation radar according to claim 6, wherein the reception means further comprises:
- first means for mixing the echo signal reflected from the target and the output signal of the frequency divider of the first modulating means;
- a voltage-controlled oscillator delivering a signal having a frequency $F = f_i + m\tau + f_m$, wherein $f_i$ is a constant predetermined intermediate frequency, $\tau$ is a time-delay ($2d/V_c$) representing the selected search distance d, Vc being the velocity of the light in the medium considered, $f_m$ is equal to $2 f_0(V_m \cos \theta + V_k)/V_c$, $V_m$ being the velocity of the missile, $V_k$ the radial velocity of the target, $f_0$ the nominal frequency transmitted and $\theta$ the angle between the velocity $V_m$ of the missile and the direction of the target;
- means for adding the output signals of the voltage-controlled oscillator and of the master oscillator of the first modulating means; and
- second means for mixing the amplified output signal of the first mixing means at the first intermediate frequency and the output signal of the adding means.

8. An airborne frequency modulation radar according to claim 7, wherein the reception means further comprise an array of p distance gates which is connected to the output of the second mixing means and is composed of a bank of p switches controlled by the second modulating means, each of the p switches being connected is series with a bandpass filter and an intermediate frequency-amplifier.

9. An airborne frequency modulation radar according to claim 8, wherein the second modulating means comprises means for generating an output pulse having a repetition $T_R$ period and a length $\gamma$ whereby the time interval between the successive operations of two of said bank of p switches is equal to $T_R/\gamma$.

10. An airborne frequency-modulation radar according to any one of claims 6 to 9, wherein the master oscillator of the first modulating means further comprises means for producing said sawtooth voltage which has a slope m which is negative.

11. An airborne frequency-modulation radar according to any one of claims 6 to 9, wherein the transmission means are composed of a solid-state transmitter.

* * * * *